(12) United States Patent
Baird et al.

(10) Patent No.: US 8,639,224 B2
(45) Date of Patent: Jan. 28, 2014

(54) PUSHING A NUMBER OBTAINED FROM A DIRECTORY SERVICE INTO A STORED LIST ON A PHONE

(75) Inventors: Randall B. Baird, Austin, TX (US); Jennifer K. Walker, Jackson, WY (US)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 11/728,003

(22) Filed: Mar. 22, 2007

(65) Prior Publication Data

US 2008/0233924 A1 Sep. 25, 2008

(51) Int. Cl.
H04M 3/42 (2006.01)
H04M 11/10 (2006.01)

(52) U.S. Cl.
USPC .................... 455/414.1; 455/413; 455/417

(58) Field of Classification Search
USPC ........................................ 455/414.1
See application file for complete search history.

(56) References Cited

U.S. PATENT DOCUMENTS

| | | | |
|---|---|---|---|
| 4,805,210 A | 2/1989 | Griffith, Jr. | |
| 5,371,788 A * | 12/1994 | Baals et al. | 379/396 |
| 5,432,844 A | 7/1995 | Core et al. | |
| 5,608,786 A | 3/1997 | Gordon | |
| 5,615,213 A | 3/1997 | Griefer | |
| 5,794,218 A | 8/1998 | Jennings et al. | |
| 5,937,040 A | 8/1999 | Wrede et al. | |
| 5,999,599 A | 12/1999 | Shaffer et al. | |
| 6,044,081 A | 3/2000 | Bell et al. | |
| 6,259,405 B1 | 7/2001 | Stewart et al. | |
| 6,271,764 B1 | 8/2001 | Okamura | |
| 6,373,817 B1 | 4/2002 | Kung et al. | |
| 6,421,544 B1 | 7/2002 | Sawada | |
| 6,438,600 B1 | 8/2002 | Greenfield et al. | |
| 6,526,293 B1 | 2/2003 | Matsuo | |
| 6,545,596 B1 | 4/2003 | Moon | |
| 6,564,261 B1 | 5/2003 | Gudjonsson et al. | |
| 6,587,680 B1 | 7/2003 | Ala-Laurila | |
| 6,643,774 B1 | 11/2003 | McGarvey | |
| 6,654,455 B1 | 11/2003 | Isaka | |
| 6,721,401 B2 * | 4/2004 | Lee et al. | 379/93.17 |
| 6,769,000 B1 | 7/2004 | Akhtar et al. | |
| 6,792,296 B1 | 9/2004 | Van Bosch | |
| 6,792,297 B2 | 9/2004 | Cannon et al. | |
| 6,798,874 B1 | 9/2004 | Ohlinger et al. | |
| 6,799,052 B2 | 9/2004 | Agness et al. | |

(Continued)

OTHER PUBLICATIONS

How to Build Smart Appliances, Albercht Schmidt, Kristof Van Laerhoven, IEEE Personal Communications, Aug. 2001, pp. 66-71.

(Continued)

*Primary Examiner* — Charles Appiah
*Assistant Examiner* — Natasha Cosme
(74) *Attorney, Agent, or Firm* — Baker Botts L.L.P.

(57) ABSTRACT

In one embodiment, a method includes receiving, by a directory service, a call from a user of a mobile phone requesting a number of a communication device associated with a callee. The number is then retrieved from a database by the directory service and then dialed to connect the mobile phone with the communication device. The directory service also sends the number to the mobile phone, the mobile phone being configured to store the number in a storage location. It is emphasized that this abstract is provided to comply with the rules requiring an abstract that will allow a searcher or other reader to quickly ascertain the subject matter of the technical disclosure.

13 Claims, 3 Drawing Sheets

(56) References Cited

U.S. PATENT DOCUMENTS

| | | | |
|---|---|---|---|
| 6,804,334 | B1 | 10/2004 | Beasley et al. |
| 6,816,469 | B1 | 11/2004 | Kung et al. |
| 6,839,761 | B2 | 1/2005 | Kadyk et al. |
| 6,847,715 | B1 | 1/2005 | Swartz |
| 6,870,835 | B1 | 3/2005 | Chen et al. |
| 6,876,734 | B1 | 4/2005 | Summers et al. |
| 6,905,414 | B2 | 6/2005 | Danieli et al. |
| 6,907,123 | B1 | 6/2005 | Schier |
| 6,912,275 | B1 | 6/2005 | Kaplan |
| 6,917,672 | B2 | 7/2005 | Brown et al. |
| 6,918,034 | B1 | 7/2005 | Sengodan et al. |
| 6,931,001 | B2 | 8/2005 | Deng |
| 6,934,858 | B2 | 8/2005 | Woodhill |
| 6,947,417 | B2 | 9/2005 | Laursen et al. |
| 6,985,745 | B2 | 1/2006 | Quaid |
| 6,987,744 | B2 | 1/2006 | Harrington et al. |
| 7,031,449 | B1 * | 4/2006 | Lundy et al. ............. 379/212.01 |
| 7,042,989 | B2 | 5/2006 | Lawson |
| 7,189,132 | B2 | 3/2007 | Nacik et al. |
| 2002/0010008 | A1 | 1/2002 | Bork et al. |
| 2002/0068537 | A1 | 6/2002 | Shim et al. |
| 2002/0086680 | A1 | 7/2002 | Hunsinger |
| 2002/0132638 | A1 * | 9/2002 | Plahte et al. ................ 455/555 |
| 2002/0167937 | A1 | 11/2002 | Goodman |
| 2002/0178228 | A1 | 11/2002 | Goldberg |
| 2002/0198004 | A1 | 12/2002 | Heie et al. |
| 2003/0061496 | A1 | 3/2003 | Ananda |
| 2004/0003070 | A1 | 1/2004 | Fernald et al. |
| 2004/0029567 | A1 * | 2/2004 | Timmins et al. ........... 455/412.1 |
| 2004/0131206 | A1 | 7/2004 | Cao et al. |
| 2004/0248586 | A1 | 12/2004 | Patel et al. |
| 2005/0054333 | A1 * | 3/2005 | Johnson .................... 455/414.3 |
| 2005/0157708 | A1 | 7/2005 | Chun |
| 2005/0177622 | A1 | 8/2005 | Spielman et al. |
| 2005/0197110 | A1 * | 9/2005 | Hasan et al. ................. 455/417 |
| 2005/0272413 | A1 | 12/2005 | Bourne |
| 2006/0002536 | A1 * | 1/2006 | Ambrose ................. 379/201.01 |
| 2006/0034336 | A1 | 2/2006 | Huh et al. |
| 2006/0104218 | A1 | 5/2006 | Kako |
| 2006/0116175 | A1 | 6/2006 | Chu |
| 2006/0126529 | A1 | 6/2006 | Hardy |
| 2006/0147002 | A1 | 7/2006 | Desai et al. |
| 2007/0037610 | A1 * | 2/2007 | Logan ........................... 455/574 |
| 2007/0112571 | A1 * | 5/2007 | Thirugnana .................... 704/270 |
| 2008/0123829 | A1 * | 5/2008 | Smith et al. .............. 379/142.17 |

OTHER PUBLICATIONS

State Intellectual Property Office of the People's Republic of China, Chinese Office Action and English Translation of Text of the Office Action—Application No. 200780052217.5, Ser. No. 2013/032100939570 (10 pgs), Mar. 26, 2013.

* cited by examiner

PUSHING A NUMBER OBTAINED FROM A DIRECTORY SERVICE INTO A STORED LIST ON A PHONE

TECHNICAL FIELD

The present disclosure relates to the fields of telephony and communication network services.

BACKGROUND

Rapid advances in mobile phones and cellular communication technologies have lead to an increase in the types of services offered to customers and end users. For example, it is commonplace for a subscriber to a cellular telephone network service to be provided with Internet access, text messaging capabilities, voice messaging, and video media transmission capabilities. Most cellular network service providers also offer their customers access to a "411" directory service that provides users with telephone numbers of a listed business, person, or other establishment. A user who dials 411 is typically connected to an Interactive Voice Response (IVR) system or human agent that attempts to solicit the geographic location and name of the person or establishment, and then either directly connects the user with the listed number or audibly speaks the number to the user, who then must write it down or commit the number to memory.

Because mobile users are often performing tasks that preclude close attention and the ability to write (e.g., driving), the user of the directory service may not be able to remember the spoken number, or may not write it down correctly. In cases where the service dials the number for the user, the conversation with the called party may get dropped in the middle of the call. In these situations the user usually must repeat the entire process of dialing 411 to again request the same phone number, often incurring another directory service fee and a significant delay before reconnection occurs.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

According to one embodiment of the present invention, a mechanism is provided for a third generation (3G) wireless network directory service that not only dials a requested telephone number for a user but also inputs or "pushes" the number into a recently dialed numbers list on the user's mobile telephone (mobile phone). In another embodiment, the directory service pushes the call record into a record file that includes callee and caller information, thereby allowing the user telephone device to receive the called number in cases where an intermediary service is providing a directory or call initiation function. For example, this later embodiment is useful in Click-to-call applications and for dialing out of commercially-available IP communication system products such as Cisco's MeetingPlace™ conferencing application. In yet another embodiment, a method of performing a 411 number lookup to a directory service results in the requested number being added to a speed dial list or to other types of directory entries on the telephone device.

Figure 1:
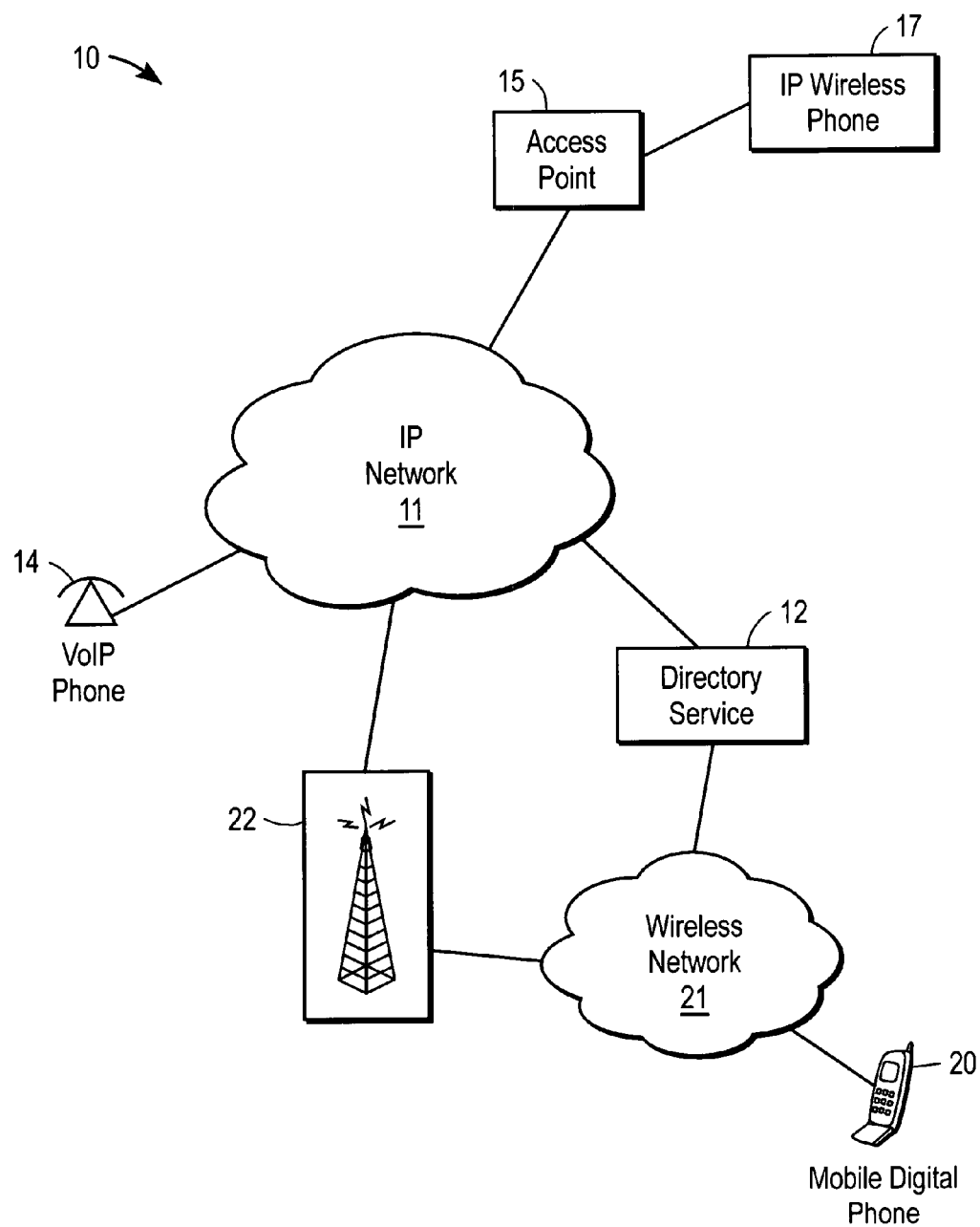
FIG. 1 illustrates an example communication system with directory service.

FIG. 1 illustrates an example communication system 10 with a directory service facility or unit 12 connected to an Internet Protocol (IP) network 11. Directory service 12 may comprise a call center facility, IVR system, or other communications service entity having hardware, firmware, or software component elements that implement the various functions described herein. As such, directory service 12 may include one or more network nodes (e.g., servers) dedicated to handling incoming calls from callers requesting a number associated with a person, business or other establishment. Each node may include a processor subsystem coupled to a main memory or database, and an input/output (I/O) subsystem. Call routing to directory service 12 may be accomplished using a data protocol addressing scheme, such as ordinary network layer IP addresses, or using mobile telephony phone numbers, as described by, for example, E.164 or E.163.

FIG. 1 also shows a mobile digital phone 20 connected to a wireless network 21. Phone 20 may access the wireless network using, for example, code-division multiple access (CDMA) protocol, the global system for mobile communications (GSM) protocol, or a third generation (3G) protocol like the universal mobile telecommunication system (UMTS) protocol. The phone 20 is capable of initiating both normal mobile telephony calls and of transmitting and receiving data using 3G data protocols, including the evolution data optimized (EVDO) extensions to CDMA, the general packet radio service (GPRS) extensions to GSM, or any number of data access protocols for UMTS, including high-speed downlink packet access (HSPDA). It is appreciated that other data access protocols may also be utilized by the phone 20.

Also shown in FIG. 1 is a voice over IP (VoIP) phone 14 directly connected with IP network 11, and an IP wireless phone 17 connected with IP network 11 via access point 15. VoIP phone 14 and IP phone 17 may each access the 411 calling services provided by directory service 12 via their respective connections with IP network 11. Other types of telephone devices may also be connected with IP network 11. For example, such devices may include a dual-mode phone, which operate as a VoIP phone over wireless (WiFi) connection when a wireless connection is available, but which can also use CDMA/GSM/UMTS protocol connections when WiFi VoIP service is unavailable.

Although not shown explicitly in FIG. 1, a time-division multiplexing (TDM) phone may also be connected to IP network 11 via an appropriate gateway device. Other devices, including PCs with softphone functionality, traditional analog phones and a variety of radio communication devices may also be used to access the call number information services provided by directory service 12.

Figure 2:
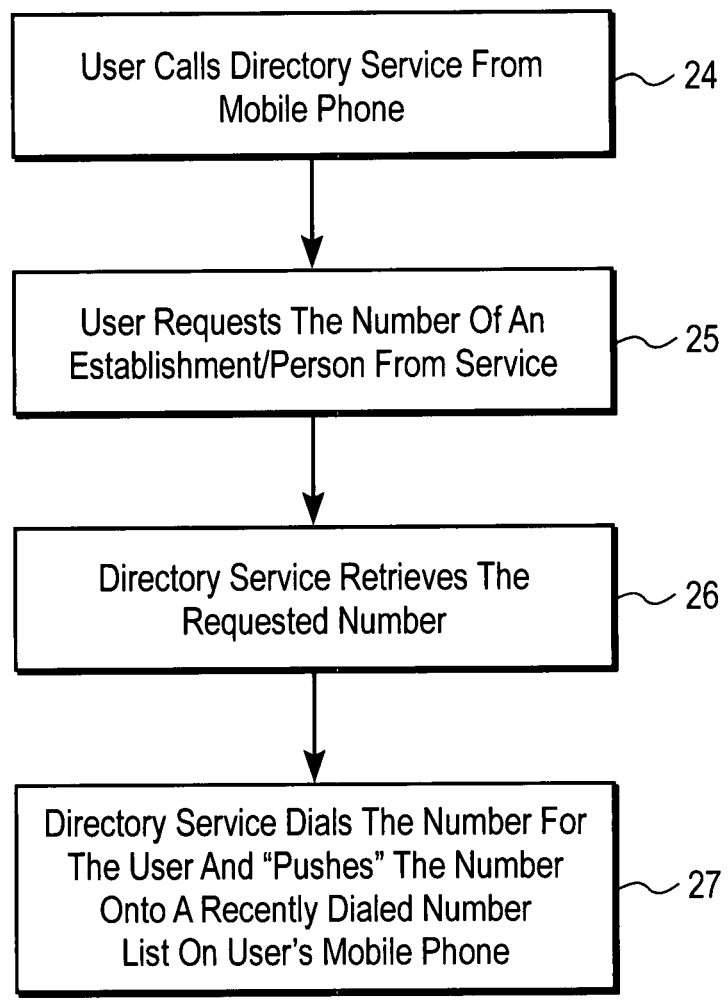
FIG. 2 illustrates an example method of obtaining a number from a directory service.

FIG. 2 illustrates an example method of obtaining a number from a directory service. The process starts with a user (caller) calling a 411 directory service from their wireless mobile phone (block 24). In one embodiment, the 411 call is answered by an IVR system that may attempt to automatically retrieve and dial the requested number based on information provided by the user in response to an IVR script. This step is shown occurring in block 25. By way of example, the IVR system may first ask the user to say the city and state of the callee, followed by the name of the callee (e.g., person, business, enterprise, or organization). In cases where the IVR system is unable to understand the caller, intervention by a human agent working at a computer workstation may be necessary.

If successful in identifying the callee and retrieving the callee's number (block 26), the IVR system or agent may then dial the number for the user. In addition to dialing the callee number for the user, the directory service also sends the callee's directory number (DN) to the user's mobile phone via the established network connection. The user's mobile phone, in turn, is configured to receive the callee number and enter it into a storage location used for storing recently dialed numbers (block 27).

In another embodiment, the mobile service provider, rather than directory service, pushes to the phone the DN to which the call is transferred. This embodiment is useful in situations where the directory service to which the user connects may not be capable of utilizing the data "push" protocol to the phone. In this case, however, the mobile service provider (i.e., the operator of wireless network 21), is able to determine the DN to which the user's call is transferred.

Figure 3:
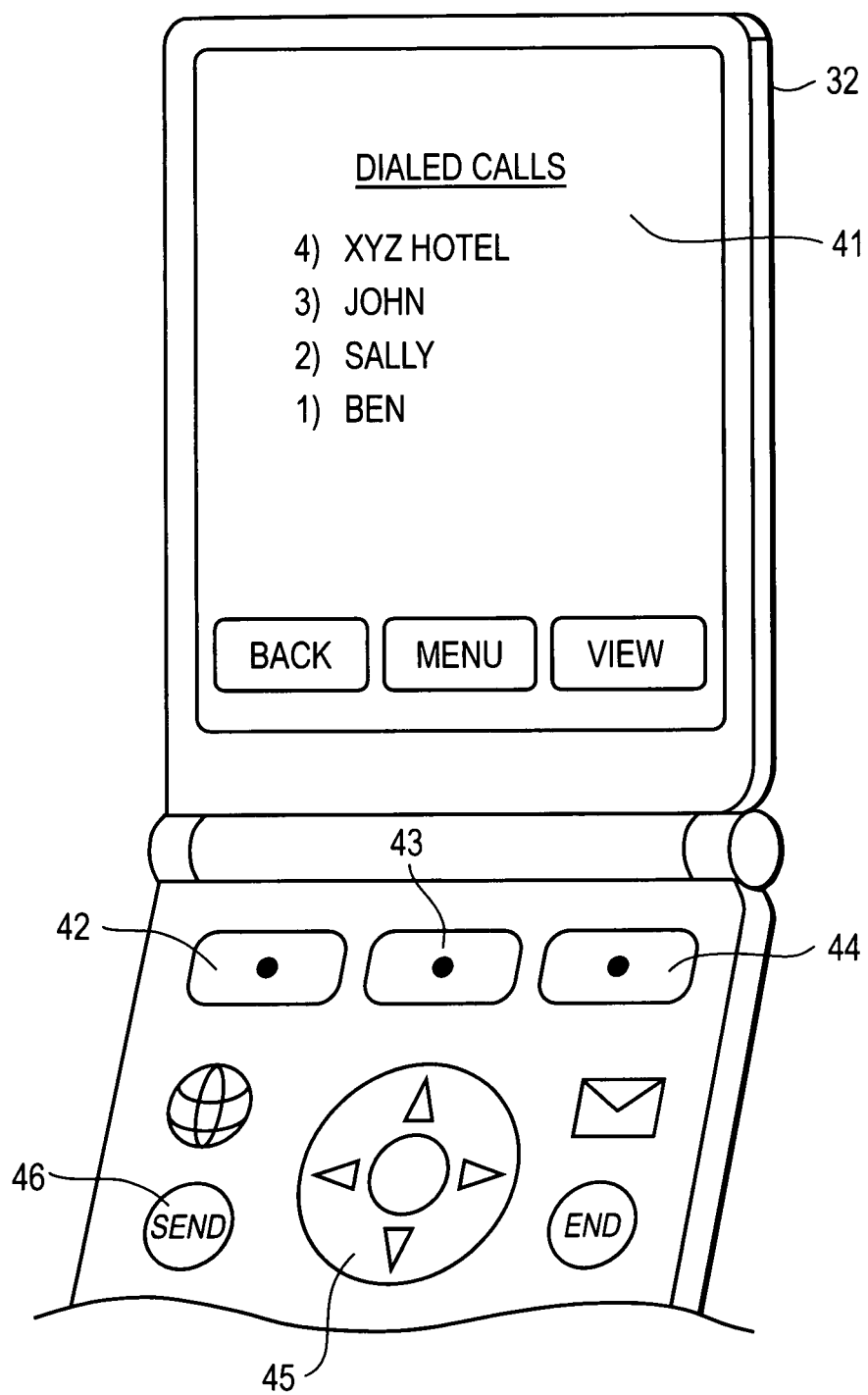
FIG. 3 illustrates an example listing of recently dialed calls displayed on a mobile phone.

FIG. 3 illustrates an example listing of recently dialed calls displayed on a page or user interface window 41 of a user's mobile phone 32. The user interface of mobile phone 32 may be embodied as executable code stored on the phone and executed by a processor. User interface window 41 lists a recent history of dialed calls of mobile phone 32, including calls that have been pushed onto the mobile phone by a directory service. The most recent calls are shown at the top of the list. In this example, the user has just called the directory service associated with his cellular network service provider to request the number of a hotel. The callee number—in this case, XYZ Hotel—is shown pushed onto the user's phone at the top of his recently dialed call list.

In this example, a user may use a cursor or selection navigation device 45 to scroll up or down the list of dialed calls. When a desired callee is highlighted, the user may then elect to view details associated with that callee, such as the full name, phone number, or other callee information. In this example, the user may view details of a particular callee by pressing soft-key button 44 when the callee's name is highlighted. The user may also dial the callee's number by selecting the callee's name using device 45 to highlight the entry in the list of calls and then pressing the Send button 46. Alternatively, the user may press soft-key button 42 to go back to a previous user interface window or menu page.

Continuing with the example of FIG. 3, pressing soft-key button 43 results in a display listing of available menu options that may be taken with respect to the highlighted number. For example, the menu options may include a selection that allows the user to place the callee's number in the user's address book, or add the callee's number to a speed dial list on the user's mobile phone. Other options may include deleting the number from the list of recently dialed calls, sending a text message to the number, or adding notes or other information associated with the number stored in the user's address book or personal directory.

Note that the user may also configure his mobile phone with settings that determine the number of pushed calls received from a directory service. For instance, a user may set his mobile phone only to store the last two pushed calls received, with older pushed calls being deleted from the user's list of recently dialed numbers. In still other alternative implementations, the user' mobile phone may be placed into a "locked" setting or configuration, in which directory service dialed numbers are not stored in any storage location on the user's phone. In other words, in a locked configuration, the user's mobile phone no longer accepts numbers pushed or sent from a directory service. A user, for example, may decide to lock his mobile phone such that no new 411 numbers are received that might result in loss of his current recently dialed history.

It should be understood that elements of the present invention may be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
   receiving, by a directory service, a call from a user of a mobile phone requesting a number of a communication device associated with a callee, the directory service comprising a third generation wireless network service;
   retrieving the number from a database;
   transferring the call to connect the mobile phone with the communication device; and
   sending, by the directory service, the number to the mobile phone, the mobile phone being configured with user settings, in a first user setting the number being stored in a storage location that includes a list of numbers including recently dialed numbers, wherein in a second user setting the mobile phone does not store the number sent from the directory service, the mobile phone including a user interface that displays the list and provides a user of the mobile phone with a selectable option to dial the number from the list; and
   in a third user setting:
      the mobile phone determines that an amount of previously stored numbers sent from the directory service and already stored in the list is equal to or greater than a user defined amount;
      in response to the determination, the mobile phone deletes, from the list, only one or more of the previously stored numbers sent from the directory service, while maintaining the recently dialed numbers; and
      the mobile phone stores the number sent from the directory service in the list.

2. The method of claim 1 further comprising sending call record information associated with the call to the mobile phone.

3. The method of claim 2 wherein the mobile phone is configured to store the call record information in the storage location.

4. The method of claim 1 wherein the directory service comprises an Interactive Voice Response (IVR) system.

5. The method of claim 1 wherein the mobile phone comprises an Internet Protocol (IP) wireless phone.

6. The method of claim 1 wherein the mobile phone comprises a code-division multiple access (COMA) digital cellular telephone.

7. The method of claim 1 wherein the mobile phone comprises a global system for communications (GSM) phone.

8. The method of claim 1 wherein the mobile phone comprises a universal mobile telecommunications system (UMTS) phone.

9. The method of claim 1 wherein the mobile phone comprises a dual-mode phone, which operable as a VoIP phone over a wireless (WiFi) connection when a WiFi VoIP service is available, or, alternatively, in accordance with a different protocol when the WiFi VoIP service is unavailable.

10. A computer-readable memory encoded with a computer program, when executed, the computer program operable to:

receive a directory service call from a user of a mobile phone that requests a number of a phone device associated with a callee, the directory service comprising a third generation wireless network service;

retrieve the number from a database that includes an entry associated with the callee;

transfer the call to connect the mobile phone of the user with the phone device of the callee; and send, by the directory service, the number to the mobile phone, the mobile phone being configured with user settings, in a first user setting the number being stored in a list of numbers including recently dialed numbers, wherein in a second user setting the mobile phone does not store the number sent from the directory service, the mobile phone comprising an Internet Protocol (IP) phone which includes a user interface that displays the list and provides a user with a selectable option to dial the number from the list; and in a third user setting:

the mobile phone determines that an amount of previously stored numbers sent from the directory service and already stored in the list is equal to or greater than a user defined amount;

in response to the determination, the mobile phone deletes, from the list, only one or more of the previously stored numbers sent from the directory service, while maintaining the recently dialed numbers; and the mobile phone stores the number sent from the directory service in the list.

11. The computer-readable memory of claim 10 wherein execution of the computer program is further operable to send call record information associated with the directory service call to the mobile phone.

12. The computer-readable memory of claim 10 wherein the mobile phone comprises an Internet Protocol (IP) wireless phone.

13. A method comprising:

receiving, by a directory service, a call from a user of a mobile phone requesting a number of a communication device associated with a callee, the directory service comprising a third generation wireless network service;

retrieving, by the directory service, the number from a database;

transferring, by the directory service, the call to connect the mobile phone with the communication device;

detecting, by a service provider of the mobile phone, the number; and sending by the service provider, the number to the mobile phone, the mobile phone being configured with user settings, in a first user setting the number being stored in a storage location that includes a list of numbers including recently dialed numbers, wherein in a second user setting the mobile phone does not store the number sent from the service provider, the mobile phone including a user interface that displays the list and provides a user of the mobile phone with a selectable option to dial the number from the list, wherein the service provider detects and sends the number in response to a determination that the directory service is unable to send the number to the mobile phone.

* * * * *